United States Patent [19]

Nauta

[11] Patent Number: 4,502,738

[45] Date of Patent: * Mar. 5, 1985

[54] WHEELED SUPPORT ASSEMBLY FOR CONVEYORS WITH LOCKING AND FASTENING FEATURE

[75] Inventor: Randal W. Nauta, Grand Rapids, Mich.

[73] Assignee: C. L. Frost & Son, Inc., Grand Rapids, Mich.

[*] Notice: The portion of the term of this patent subsequent to Jan. 11, 2000 has been disclaimed.

[21] Appl. No.: 450,464

[22] Filed: Dec. 16, 1982

Related U.S. Application Data

[63] Continuation-in-part of Ser. No. 208,285, Nov. 14, 1980, Pat. No. 4,367,905.

[51] Int. Cl.³ .............................................. F16C 19/06
[52] U.S. Cl. .................................... 384/477; 384/543; 384/544
[58] Field of Search ...................... 308/182, 187, 187.1, 308/187.2, 190, 191, 192, 236

[56] References Cited

U.S. PATENT DOCUMENTS

| | | | |
|---|---|---|---|
| 1,617,085 | 2/1927 | Specht | 308/190 |
| 2,117,988 | 5/1938 | Schock et al. | 105/154 |
| 2,512,148 | 6/1950 | Gaines | 308/16 |
| 2,976,089 | 3/1961 | Vogt | 308/37 |
| 3,086,826 | 4/1963 | Gunnell | 308/37 |
| 3,469,892 | 9/1969 | Langstroth | 308/3.8 |
| 3,553,765 | 1/1971 | Frost | 16/107 |
| 3,602,150 | 8/1971 | Frost et al. | 104/172 S |
| 3,971,601 | 7/1976 | Sytsma | 308/16 |
| 4,010,987 | 3/1977 | Jasperse et al. | 308/187 |
| 4,026,614 | 5/1977 | Neder | 308/189 R |
| 4,154,447 | 5/1979 | Francis, Jr. et al. | 277/24 |

FOREIGN PATENT DOCUMENTS 2834042  2/1979  Fed. Rep. of Germany .

OTHER PUBLICATIONS

Drawing No. 6280000 by C. L. Frost & Son.

*Primary Examiner*—Lenard A. Footland
*Attorney, Agent, or Firm*—Price, Heneveld, Huizenga & Cooper

[57] ABSTRACT

A wheeled support assembly for conveyors includes a wheel assembly having an outer race, an inner race, a plurality of rolling elements positioned therebetween, and a support or bracket. The bracket defines a noncircular aperture in cross section, and the inner race defines a noncircular through bore in cross section. A support shaft having a headed portion extends through the inner race and into the bracket aperture. The support shaft has a noncircular in cross section outer surface which is engaged by the inner race and the bracket aperture to prevent relative rotation. The support shaft defines a threaded bore which receives a threaded fastener extending through the bracket aperture. The support shaft, inner race and bracket are dimensioned so that the shaft normally extends into but not through the bracket aperture, permitting convenient removal of the wheel without disturbing the support or bracket.

20 Claims, 10 Drawing Figures

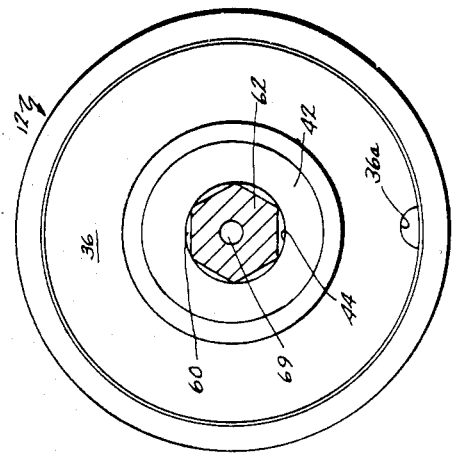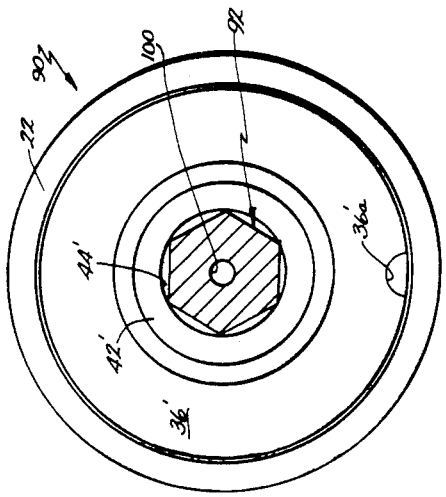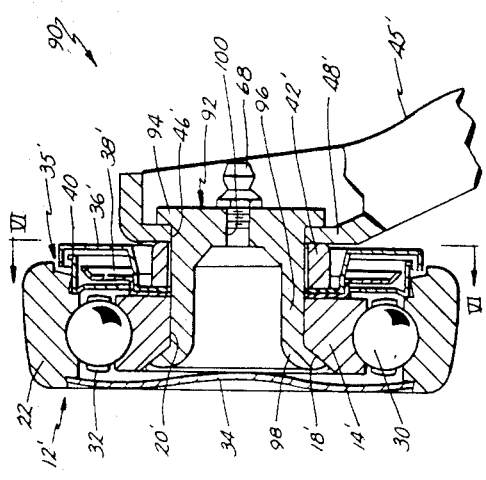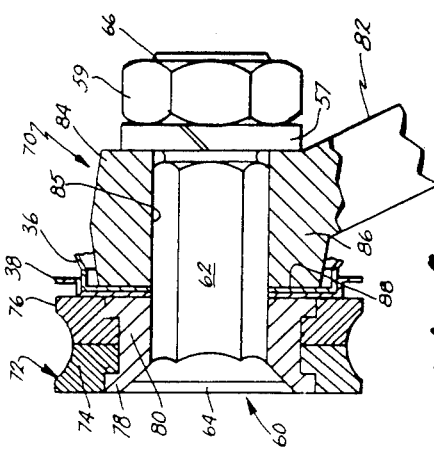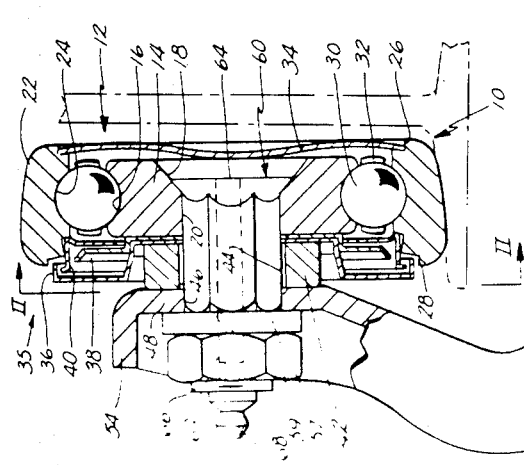

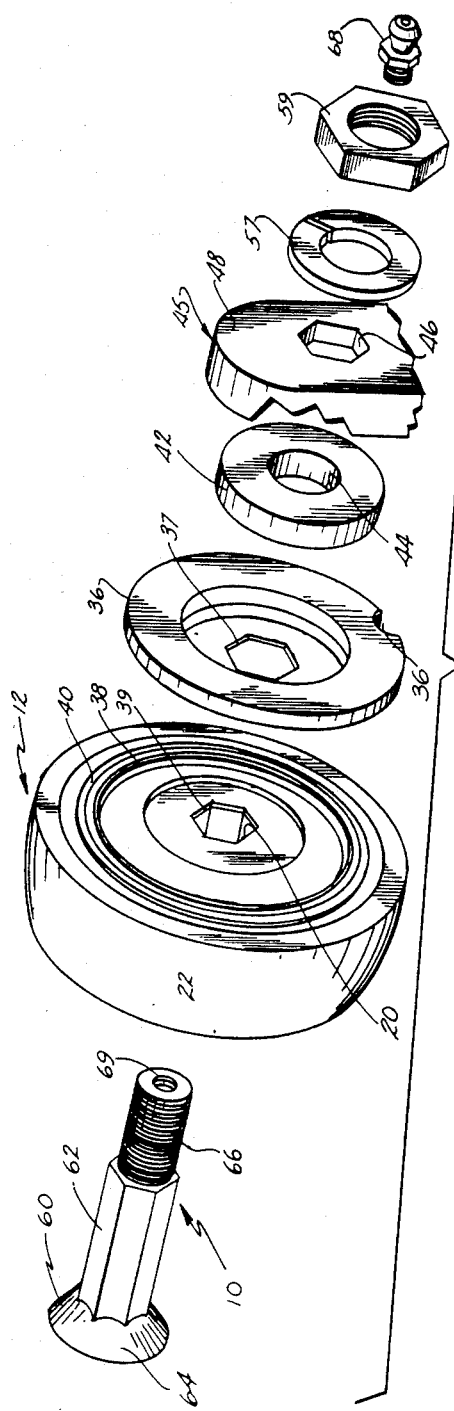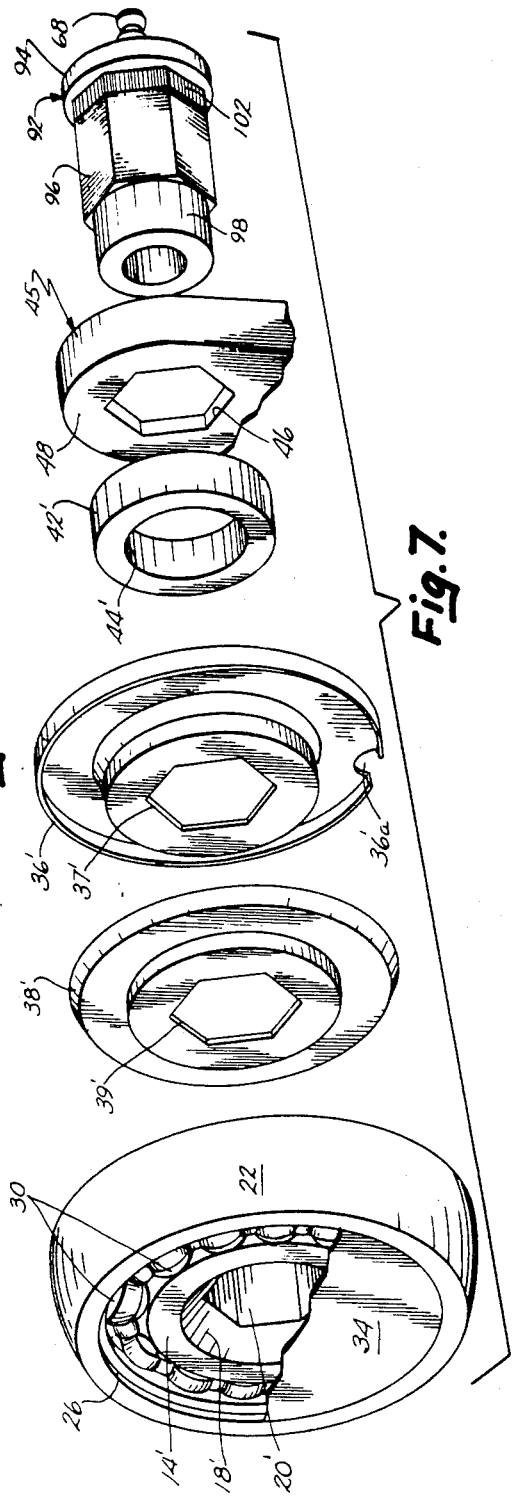

WHEELED SUPPORT ASSEMBLY FOR CONVEYORS WITH LOCKING AND FASTENING FEATURE

CROSS REFERENCE TO RELATED APPLICATION

This application is a continuation-in-part of copending application Ser. No. 208,285, filed Nov. 14, 1980, and now U.S. Pat. No. 4,367,905.

BACKGROUND OF THE INVENTION

In the operation of conveyor systems, and especially trolley wheel and support assemblies in overhead systems, including power and free systems, or trolley assemblies including wheeled carrier supports in floor conveyor systems, significant problems result from the rotation of the various parts in such assemblies during operation. Conventionally known bolts and/or rivets, which are typically used to secure trolley brackets to trolley wheel assemblies which ride on overhead conveyor tracks, have been relied on for a dual function of both retaining the various parts together and also keeping sufficient force, i.e., compression, on such parts to prevent their rotation during use. However, loosening of the various assembly parts around such bolts or rivets in operation causes rotation and allows the parts to move axially apart from one another in the assembly, resulting in several problems. Such problems include the loss of full support for the ball or rolling elements in full ball complement trolley wheels, the premature wear and failure of the wheel support areas of trolley brackets, the premature wear and failure of the supporting shaft such as the rivet or bolt, and the inability to properly drain or remove contaminants from the wheel bearing assembly. In addition, prior known assemblies provided less than optimum load bearing capabilities and weight distribution within such assemblies.

A concurrent problem with prior known trolley assemblies was the lack of ability to easily assemble and disassemble the trolley wheel assembly from the support or trolley bracket in the overhead conveyor system. In many cases, it is desired to disassemble and replace a trolley wheel in an overhead system without removing the trolley brackets from the overhead conveyor chain and without disassembling the conveyor chain which is a laborious task. The problem is especially acute in fully closed or sealed wheel assemblies having lubrication seals or closure members completely enclosing the rolling element receiving area between the inner and outer races of such assemblies. Such assemblies may be either permanently lubricated or include relubrication features. In such situations, access to the supporting shaft, bolt or rivet is impossible because of the enclosed nature of the wheel assembly. Accordingly, there is no easy way to hold the bolt and remove the nut from the bolt to enable removal of the wheel assembly from the trolley bracket. In such cases, it was often necessary to remove the entire trolley bracket from the chain and remove one or more of the shields or closure members from the wheel in order to remove the wheel assembly from the trolley or support bracket.

An attempt at solving the above problems in a trolley bracket and wheel assembly is shown in U.S. Pat. No. 3,553,765. This assembly requires a special trolley bracket having a machined projection including flat surfaces which engage corresponding flat surfaces on a specially formed, lateral extension of a one-piece inner race of a wheel assembly, as well as a shield member on one side of the wheel. A circular bolt extends through all of the parts and engages threads on the inner race to hold the parts together. This structure, however, cannot be used with stamped, sheet metal or conventional forged trolley brackets because of the required, specially formed bracket extension. Further, the use of multi-part inner races and full ball complement wheels is difficult with such structure because of the required, one-piece inner race and lateral extension to prevent rotation. Also, a special locking washer engaging the bolt and bracket must be used to prevent bolt rotation. Load distribution is also less than optimum because the circular bolt cannot distribute loads over a wide base area. The provision of specially machined parts is also very expensive and detracts from the acceptance of the assembly.

Another trolley bracket and wheel assembly in which a portion of the various inner race and bracket parts are nonrotational is shown in U.S. Pat. No. 3,971,601. This structure does not include any shield or seal structure at all, let alone a shield structure which prevents rotation. Also, all parts of the inner race assembly are not positively prevented from rotating, especially if loosening of the assembly occurs. Further, load distribution is again less than optimum.

In one such system, a small, separate key is fitted between a milled slot or keyway in a supporting shaft for a wheel on a four wheel carrier assembly and the inner race of a wheel, a shield member and a central support member or casting in such an assembly. The small key is very difficult to assemble and maintain, in addition to requiring a much greater expense for machining various keyways and corresponding shapes in the mating parts. Moreover, such wheel assemblies require removal of closure/shield members before the assembly can be removed or disassembled, do not provide advantageous weight or load distribution, and rely greatly on the relatively small key which, if broken or distorted, cannot prevent the rotation and consequent loosening of the assembly discussed above. In actual practice, such keys and keyways have been found to have an unacceptable failure rate.

The present invention provides a solution to the above-noted problems in the support and use of trolley assemblies in various conveyor systems.

SUMMARY OF THE INVENTION

Accordingly, the present invention provides a trolley or carriage assembly for conveyors in which the inner race of a wheel assembly, a shield or seal for the wheel, and a support for supporting a workpiece to be transported by the assembly, such as a trolley bracket, a central casting for a four-wheel carrier, or the like, are all simultaneously locked together and against rotation with respect to each other and a supporting and retaining shaft by the noncircular outer circumferential shape of the shaft. This invention eliminates the need for the supporting shaft to maintain sufficient compression on the assembled parts to prevent rotation only by frictional resistance between the parts because the noncircular circumference accomplishes that antirotational function regardless of the tightness of the parts. Moreover, the present invention also helps maintain the parts tightly together to prevent premature wear and failure.

In one aspect, the present invention is an improved trolley/carriage assembly for conveyors of the type including a plurality of rolling elements, outer race means and inner race means for supporting the rolling elements in a space therebetween to allow rotation of the outer race means with respect to the inner race means, and shield means adjacent at least one side of the race means for covering the space between the race means and shielding the rolling elements to resist their contamination with foreign matter. A support means is also included for supporting an object to be transported on the assembly along with shaft means for securing together and supporting the inner race means, shield means and support means. The improvement resides in the shaft means having a noncircular outer circumference while the inner race means, shield means and support means each include a noncircular aperture therethrough corresponding in shape to the shaft means. The shaft means extend through the respective apertures to simultaneously lock the inner race means, shield means and support means against rotation with respect to one another and the shaft means. Retaining means are spaced along the shaft means to hold the inner race means, shield means and support means together on the shaft means.

In other aspects of the invention, the outer circumference of the shaft means and corresponding apertures in the other parts include noncircular surfaces such as at least one flat, planar surface. When such surfaces are positioned at the bottom of the shaft means, any weight and load on the assembly is evenly distributed over the surfaces. Further, the support means may be a trolley bracket and especially a bracket stamped from sheet metal material, a spacer or collar may be included between tthe support or bracket and the shield means and received over the shaft means, and the shaft means itself may have a hexagonal configuration.

In yet other aspects, the shield means may include a labyrinth seal assembly on one side of the assembly. A full closure member may be included on the other side and is rotational with the outer race means. In addition, a lubrication passageway may be provided through the shaft for relubrication of the wheel assemblies. The inner race means may also be formed from one or more members, depending on whether the wheel assembly is a full ball complement wheel or a retainer-type wheel.

The present invention overcomes numerous disadvantages of prior known assemblies noted above. The noncircular cross-sectional shape of the supporting shaft prevents rotation between the trolley bracket, nonrotating shield members and inner race parts, thereby promoting less wear, longer life and a smaller failure rate for the assembly. The shaft means in the present invention need not compress the various parts together to prevent rotation. Additional small parts requiring expensive machining operations and difficult assembly procedures, such as keys and keyways, are avoided. A weep or drainage hole, in the shield or seal assembly, to remove foreign matter and liquids from the interior of the wheel assembly, is automatically retained at the bottom during assembly because of the nonrotational engagement with the support shaft. In full ball complement wheels including several inner race parts, full support for the ball rows and elimination of any rotation of the inner race parts is provided. In addition, a simple antirotational structure is provided which is especially useful in stamped trolley brackets which include less material in the wheel supporting areas while maintaining the ability to prevent any rotation of the bracket, nonrotating shield and inner race parts with respect to the shaft. The invention also allows the use of smaller, lighter rivets and/or fastening bolts since such parts are not relied upon to maintain nonrotation between the parts. Further, the noncircular shaft better distributes the load borne by the assembly over a surface area as opposed to a line as was previously known with circular support shafts. Finally, the assembly promotes easier assembly and disassembly of the wheel structure from the support or trolley bracket, especially with closed or permanently lubricated wheels where access to the bolt is no longer necessary, because the bolt is automatically locked against rotation, allowing simple removal of any fastener without special tools or procedures to disassemble the support or bracket from the conveyor system.

These and other objects, advantages, purposes and features of the invention will become more apparent from a study of the following description taken in conjunction with the drawings.

BRIEF DESCRIPTION OF THE DRAWINGS

FIG. 1 is a fragmentary, end elevation with portions shown in section of one embodiment of the present trolley assembly invention including a retainer-type trolley wheel assembly secured to a stamped, sheet metal trolley bracket by a noncircular, hexagonal threaded bolt;

FIG. 2 is a sectional side elevation of the trolley assembly of FIG. 1 taken along plane II—II of FIG. 1;

FIG. 3 is an exploded, perspective view of the trolley assembly of FIGS. 1 and 2;

FIG. 4 is an enlarged, end elevation of a portion of a second embodiment of the present trolley assembly invention illustrating a modified inner race and trolley bracket structure with portions shown in section;

FIG. 5 is a fragmentary, end elevation of a third embodiment of the present trolley assembly invention with portions shown in section including a trolley wheel assembly permanently secured to a stamped, sheet metal trolley bracket with a noncircular, hexagonal rivet;

FIG. 6 is a sectional, side elevation of the trolley assembly taken along plane VI—VI of FIG. 5;

FIG. 7 is an exploded, perspective view of the trolley assembly of FIGS. 5 and 6;

DESCRIPTION OF THE PREFERRED EMBODIMENTS

Figure 8:
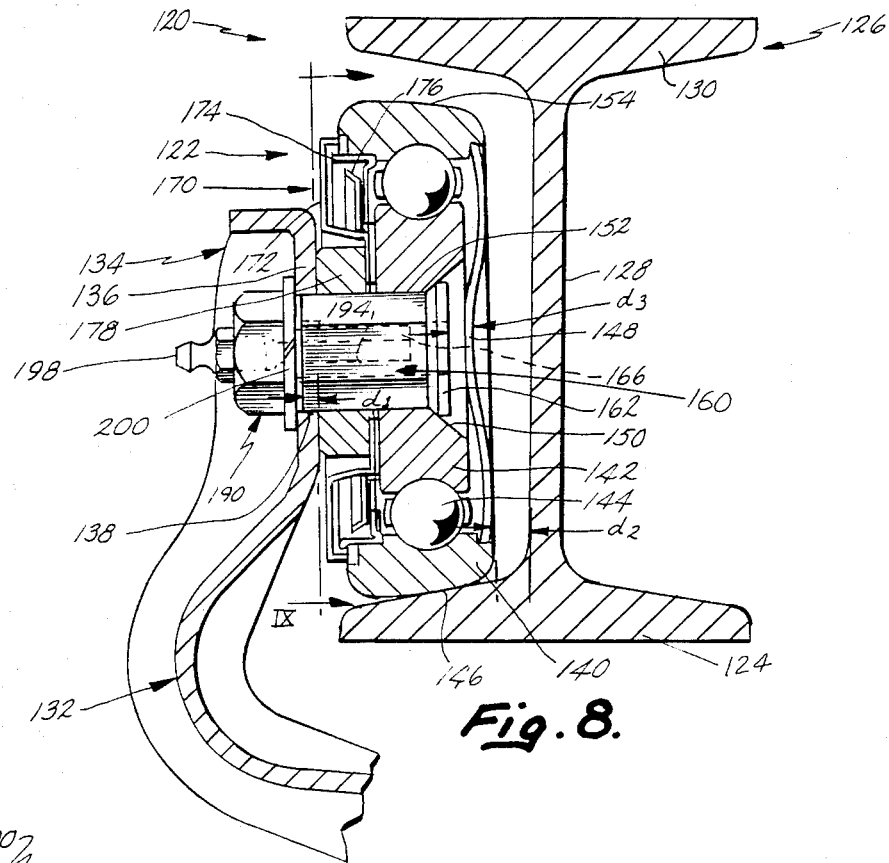
FIG. 8 is a fragmentary, end elevation with portions shown in section of a fourth embodiment of a trolley wheel assembly in accordance with the present invention.
Figure 10:
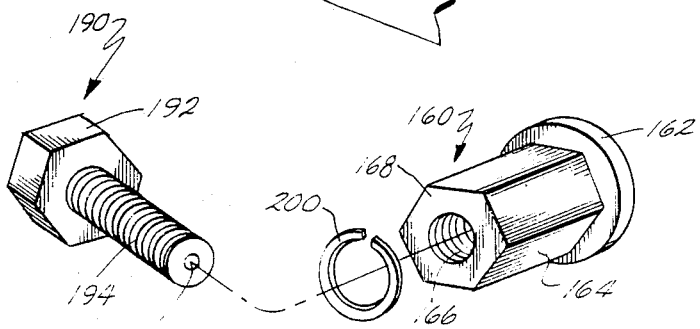
FIG. 10 is an exploded, perspective view of a shaft means and fastener incorporated in the embodiment of FIG. 8.

Referring now to the drawings in greater detail, FIGS. 1–3 illustrate a first embodiment 10 of the present trolley assembly invention including a trolley wheel assembly 12 nonrotationally secured to a support or trolley bracket 45 by means of a noncircular support and retaining shaft or bolt 60. Trolley assembly 10 is designed for support and movement along a conventional I-beam overhead conveyor track (shown in phantom in FIG. 1) such that a pair of such assemblies are secured in alignment on either side of the central vertical web of such a track. FIG. 1 illustrates the manner in which a pair of the brackets 45 are inserted in the middle of a center link 56 of an overhead conveyor chain and spaced apart by a downwardly extending spacer or attachment 58 from which a workpiece may be hung or suspended. Brackets 45 curve upwardly and around the lower wheel supporting flanges of the I-beam track to support wheel assemblies 12 generally at a slight angle from the horizontal thereon. The track, spacer or attachment 58, and chain 56 form no part of the present invention.

Trolley wheel assembly 12 includes a single inner race member 14 preferably machined from steel and case hardened or otherwise treated having a partially circular inner raceway 16 on its outer circumference and a countersunk, conical recess 18 leading to a central opening 20 on one side. Opening 20 has a noncircular shape, preferably that of a regular polygon such as a hexagon, designed to match and slip over a correspondingly shaped support shaft or bolt 60, as will be more fully described below. An outer race 22 is preferably also machined from steel and case hardened and includes a partially circular outer raceway 24 on its inner circumference radially aligned but spaced outwardly from inner raceway 16. Outer race member 22 also includes a crowned outer circumference engaging the slope of the I-beam track, and stepped, annular recesses or shoulders 26, 28 for receipt of a closure member 34 on the same side as inner race recess 18 and a portion of a labyrinth seal assembly 35 on the opposite or bracket side of inner race 14. Since inner race member 14 is one piece, a series of spherical ball bearing rolling elements is received between and within raceways 16, 24 to rotationally support outer race 22 with respect to the inner race 14. Balls 30 are spaced apart and retained in their spaced relationship by a conventional cage or retainer 32.

As shown in FIG. 1, annular recess 26 receives a closure disc member 34 which covers one end of the inner race member on the same side as recess 18 along with the space between inner and outer race members 14, 22 to prevent the entry of foreign matter into the bearing area. Closure member 34, which is initially a dome-shaped disc, is flexed or "oil-canned" into place in the annular recess 26 for secure retention.

On the side of wheel assembly 12 opposite to closure member 34 is the labyrinth seal assembly 35. Seal assembly 35 includes an outer stepped or configured, annular shield or seal member 36, an intermediate, annular, stepped shield or seal member 38 and an inner annular generally L-shaped seal or shield member 40. Outer and intermediate shield or seal members 36, 38 each include a noncircular, preferably hexagonal aperture 37, 39, respectively (FIG. 3), corresponding to and adapted to slide over and telescope on shaft or bolt 60 in the same manner as does inner race member 14. Seal members 36, 38 both extend radially outwardly from shaft 60 toward the outer race but include axially extending portions such that each includes portions spaced respectively outwardly of the inner seal member 40. Seal 40 is retained in a portion of annular stepped recess 28 on the side of the outer race 22 opposite from closure member 34, as shown in FIG. 1. The radially extending flanges of the seal members 36, 38, 40, respectively, overlap one another at spaced locations to form a labyrinth path through which any foreign matter must pass before entry into the bearing area of the wheel assembly. Shield 36 also includes a semi-circular weep hole or drainage aperture 36a aligned with one of the flats in hexagonal aperture 37. When slipped over bolt shank 62 with the noncircular aperture at the bottom, weep hole 36a is retained at the bottom of wheel assembly 12 in radial alignment with the bottom of bolt 60 so that any foreign matter or liquids entrapped within the wheel assembly can drain out properly. The overall seal assembly 35, except for its method of securement to shaft 60 as in the present invention, is as shown and described in U.S. Pat. No. 3,537,725, assigned to the same assignee as the present application, the disclosure of which is hereby incorporated by reference herein.

Also telescoped over shaft or bolt 60 is a spacing member or collar 42 forming an annular ring having radially extending side surfaces and a width slightly wider than the axial width of seal member 36. Collar or ring 42 includes a circular central aperture, unlike inner race member 14 or seal members 36, 38, because it need not be prevented from rotating with respect to the shaft or bolt 60. In any event, compression force between bracket 45 and seal member 40, when the wheel assembly is attached to the bracket, will normally prevent rotation of the collar.

As is best seen in FIG. 1, support member or trolley bracket 45 is telescoped over shaft or bolt 60 outboard of spacer or collar 42 by means of a noncircular, preferably hexagonal aperture 46 equivalent in size to those in inner race member 14 and seal members 36, 40. Bracket 45 is stamped from sheet metal and includes a generally planar, wheel supporting area 48, a chain link engaging end 50 and an intermediate connecting portion 52 which is designed to curve upwardly and outwardly around the I-beam support track for the trolley assembly. Bracket 45 also includes an outwardly extending peripheral or marginal edge flange 54 which stiffens and strengthens the bracket. Bracket 45 may be any one of the various embodiments of trolley brackets shown in U.S. Pat. Nos. 4,220,243; 4,210,238; or U.S. patent applications Ser. Nos. 872,265, filed Jan. 25, 1978, invented by Gerald W. Gurney and Siegfried K. Weis and now U.S. Pat. No. 4,258,841; 3,963, filed Jan. 17, 1979, invented by Charles C. Frost, Gerald W. Gurney and Frederick R. Sytsma and now U.S. Pat. No. 4,266,657; or 3,964, filed Jan. 17, 1979, invented by Charles C. Frost and Siegfried K. Weis and now U.S. Pat. No. 4,266,658, all of which are commonly owned by the assignee of the present application and the disclosures of all of which are hereby incorporated by reference herein.

Of course, other support members, such as castings or carriages for multi-wheel carriers in power and free overhead conveyors and/or in-floor conveyors, can also be used with the present invention.

As is best seen in FIGS. 1 and 3, support shaft or bolt 60 includes shank or body portion 62, has the shape of a regular polygon, in this case a hexagon, an integral head having a conical under surface 64, and an extending, threaded end portion 66. The shank 62 has a series of elongated flat, planar areas forming an outer circumference having the cross-sectional hexagon shape. Other noncircular shapes, i.e., triangular, square, rectangular, pentagonal or other polygons, could also be used. Shank 62 can also include but a single noncircular area, such as a flat, planar area, while apertures 20, 37, 39 and 46 would, in that case, include but a single correspondingly located flat area.

Trolley wheel assembly 12, seal members 36 and 38, spacer collar 42, and bracket 45 are assembled on support shaft or bolt 60 by first telescoping inner race member 14 over the threaded end porton 66 of bolt 60 such that conical head surface 64 seats in the correspondingly shaped conical recess 18 or the inner race. Seal member 40 is secured in outer race 22 prior to such assembly. Thereafter, seal members 38 and 36 are respectively telescoped over the hexagonal shank 62 of bolt 60 such that they abut against one another and against the flat or planar side surface of inner race member 14 opposite the side on which recess 18 is included. Collar 42 is then telescoped over shank 62 and against the flat or planar inner radial area of seal member 36, following which wheel support area 48 of bracket 45 is telescoped over hexagonal shank 62.

As will be understood from FIG. 1, the length of the hexagonal shank area 62 is slightly shorter than the combined widths of the inner race member 14 at the inner end of recess 18, seal members 36, 38, collar 42 and wheel support area 48 of bracket 45. A lock washer 57 and a threaded nut 59 are threaded on the end 66 of the bolt 60 to complete the assembly. Upon tightening, nut 59 forces bracket 45, collar 42, seal members 36, 38 and inner race member 14 against head 64 of bolt 60 to retain them tightly in engagement with one another. Rotation of race member 14, seals 36, 38 and bracket 45 with respect to bolt 60 and one another is prevented by the interengagement of noncircular apertures 20, 37, 39 and 46 with the noncircular outer circumferential surface of the bolt shank 62. Rotation of collar 42 is resisted by its engagement between bracket area 48 and the inner radial area of seal 36. Also, bracket 45 and seal 36 do not rotate. Since the width of collar 42 is slightly wider than the overall axial extent or width of seal member 36, the bracket wheel support area 48 is spaced away from the seal 36 and therefore does not contact or interfere with its operation.

The final step in the assembly is to support the wheel and bracket structure on an appropriate support tool such as that disclosed in U.S. patent application Ser. No. 165,292, filed July 2, 1980 and now U.S. Pat. No. 4,364,614, incorporated by reference, and to secure closure member 34 in annular recess 26 on the outer side of wheel assembly 12. The securement of closure member 34 effectively prevents the removal of bolt 60 from the assembly even if the nut 59 and washer 57 are removed and the entire wheel assembly 12 is removed from bracket 45.

Trolley wheel assembly 12 may be relubricated by insertion of grease or other lubricant through a conventionally known Zerk-type grease fitting 68 secured in an axially extending bore or lubricant passageway 69 extending along the central axis of bolt 60. Lubricant passes through passageway 69 into the space between bolt head 64 and closure member 34 and moves radially outwardly to the space between the raceways 16, 24 for proper lubrication of the rolling elements 30.

Referring now to FIG. 4, a modified embodiment 70 of the trolley assembly is shown wherein like numerals indicate like parts to embodiment 10. Embodiment 70 includes the same outer race member (not shown) and shield or seal members (not fully shown), as described above in connection with FIGS. 1-3. However, a modified inner race assembly 72 is included having left and right annular, inner race rings 74, 76 together forming a partially circular inner raceway 77. Each ring 74, 76 includes a central circular bore and an annular recess on the outer side communicating with that bore for receiving the securing flanges 78 of an annular hub 80 which retains the inner race parts together after insertion of a full complement of balls (not shown) which eliminate the need for a cage or retainer as was used at 32 in the assembly 10. Hub 80 includes a preferably hexagonal aperture 81 adapted to slide over and fit closely around bolt shank 62, as well as a conical recess 83 for receiving bolt head 64.

Embodiment 70 also includes a different, forged trolley bracket 82 including a wheel support head 84 having a noncircular, preferably hexagonally shaped aperture 85 therethrough. Head 84 includes an outwardly extending projection 86 having a radially extending, planar face surface which abuts against the inner radial area of outer seal member 36 to clamp the seal members 36 and 38 against the planar side surface of inner race assembly 72, as shown in FIG. 4. The supporting shaft or bolt 60 is the same as that described above in connection with assembly 10. The assembly procedure for the entire assembly 70 is the same as that for assembly 10 except that the need for a spacer collar 42 is eliminated because of the projecting face 86 on forged bracket 82. Further, the three member inner race assembly 72 is telescoped over bolt 60 and against head 64 in the same manner as in single piece inner race member 14 in embodiment 10.

The assembly procedure for assemblies 10 and 70 illustrates an important advantage of the present invention. That is, when it is desired to remove wheel assembly 12 from bracket 45 after the entire assembly has been installed in an overhead conveyor system, a workman need merely loosen nut 59 with an appropriate wrench and need not worry about holding bolt 60 against rotation during such loosening. Access to hold such bolt would be prevented in any event by closure member 34. Such rotation will automatically be prevented by the engagement of the hexagonal bolt with the hexagonal aperture 46 in bracket 45, which bracket will, at that time, be secured in a chain link 56 in the overhead conveyor system. Thus, wheel assembly 12, including bolt 60, may be easily removed from the bracket without removing bracket 45 from chain 56 and the overall conveyor system, thereby greatly decreasing maintenance time and allowing immediate replacement of wheel assembly 12 without disassembly of the bracket from the chain.

Referring now to FIGS. 5-7, a third embodiment 90 of the trolley assembly is shown wherein like numerals indicate like parts to those previously described. In this case, a closed trolley wheel assembly 12' is used wherein outer race member 22, ball members 30, retainer cage 32, shield or seal member 40, as well as closure member 34 are all identical to those previously described. Inner race member 14' and seal members 36', 38' and 40' are very similar to inner race member 14 and seal members 36, 38 except that they include larger, hexagonal apertures 20', 37' and 39' extending therethrough. Inner race member 14' has a conical recess 18' merging with the aperture 20'. In addition, spacer collar 42' is of the same width as spacer collar 42 but includes a larger circular aperture 44', best seen in FIG. 7. Stamped trolley bracket 45', including wheel support area 48', has a larger hexagonal opening 46'. All of the hexagonal apertures and circular apertures through the various parts in assembly 90 are larger because of the use of larger support rivet 92 having an integral head 94 and a shank portion 96 which is larger than bolt shank 62 and has a series of rectangular, flat or planar areas extending around its circumference to form the hexagonal cross-sectional shape matching that of the apertures through the various parts. Smaller rivets may also be used. Rivet 92 also includes an extending, formable end portion 98 which is permanently deformed or formed over to retain inner race member 14', seal members 36', 38', spacer collar 42' and bracket 45' tightly against rivet head 94. Once formed over or rolled over, end 98 permanently retains the various parts together against head 94 such that rivet 92 must be broken or destroyed to disassemble the assembly 90. Closure member 34 is secured on outer race member 22 after rivet 92 is permanently installed through the various parts.

As shown in FIG. 5, the interior of rivet 92 is hollow. An axial extending, central circular passageway or bore 100, having a conventional Zerk-type grease fitting 68 inserted therein, leads to that hollow rivet interior. Lubricant may be inserted through the permanently installed rivet 92 by means of Zerk fitting 68 and passageway 100 to the interior of the closed wheel 12'. The exterior circumference of the shank 96 or rivet 92 also includes ribs or serrations in a band 102 extending around the circumference immediately adjacent the inside surface of head 94 to help retain the rivet on the bracket during assembly.

In the various embodiments 10, 70 and 90, various parts of the wheel assembly not otherwise specified above are typically formed from metal by either machining or stamping as required. Of course, the brackets 45 and 45' are stamped from sheet metal via conventional transfer press or progressive die stamping processes, while bracket 82 is forged with conventionally known forging processes.

A still further embodiment of the present invention is illustrated in FIG. 8 and generally designated 120. Embodiment 120 includes a wheel assembly 122 riding on a lower flange 124 of an I-beam track 126. I-beam track 126 includes a central, vertical web 128 and an upper flange 130. Wheel assembly 122 is supported on and secured to a trolley bracket or support 132. Bracket 132 includes a lower portion (not shown) which is secured to a conveyor chain, as with bracket 45 illustrated in FIG. 1. An upper portion 134 of bracket 132 defines a generally planar, wheel supporting portion 136. Portion 136 defines an aperture 138.

Wheel assembly 122, as with the previous embodiments, includes an outer race 140, an inner race 142 and a plurality of rolling elements 144 positioned between the races. An outer peripheral surface 146 of race 140 engages and rides on flange 124 of track 126. Secured to outer race 140 is a closure plug 148. Plug 148 faces central web 128 of the track 126 and closes a face of the wheel assembly. Inner race 142 defines a generally conical recess 150 which opens towards plug 148. Inner race 142 further defines a through bore 152 which opens into race recess 150 and through face 154 of the inner race.

In embodiment 120, inner race 142 is supported on a shaft means 160. Shaft means 160 is an elongated, one-piece body defining a head portion 162 which is disposed within recess 150. Shaft 160 further includes an elongated portion 164 which has a noncircular in cross section outer surface 165. As illustrated, portion 164 is hexagonal in cross section. Shaft 160 further defines a threaded through bore 166 which extends from a face 168 and through headed portion 162.

Figure 9:
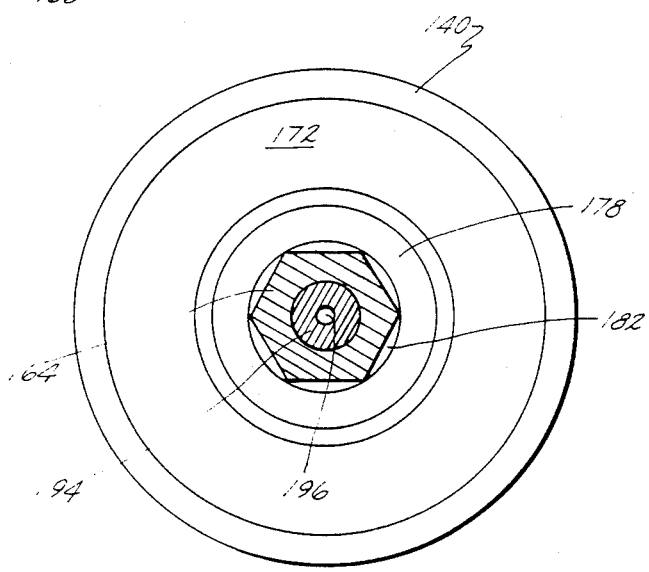
FIG. 9 is a cross-sectional view taken generally along line IX—IX of FIG. 8.

In embodiment 120, a seal means 170 surrounds shaft 160. Seal means 170 includes an outer shield 172, an inner shield 174 and an intermediate shield 176, as in the previous embodiments. A spacer 178 also surrounds shaft 160. The inner race through bore 152 has a noncircular cross section conforming to the noncircular cross section of shaft 160. Shields 172 and 176 of seal means 170 also define apertures. These apertures may also be noncircular in cross section and engage the outer peripheral surface of shaft 160. Spacer 178 may have a circular aperture 182, as shown in FIG. 9. In the alternative, spacer aperture 182 may be noncircular in cross section conforming to the outer peripheral surface of shaft 160 and engaging same. Aperture 138 of bracket upper portion 134 has a noncircular cross section which conforms to and engages the outer peripheral surface 165 of shaft 160.

The wheel assembly of FIG. 8 is secured to and retained on bracket portion 134 by a threaded fastener 190. Fastener 190 is a bolt having a bolt head 192 and a threaded shaft 194. Fastener 190 also defines a lubricating passageway or through bore 196 which opens through both ends of the bolt. Supported on bolt head 192 is a grease fitting 198 which extends into the lubricating passageway 196.

As should be readily apparent, shaft 160 is positioned within bore 152 and closure plug 148 is "oil-canned" onto outer race 140. Seal means 170 and spacer 178 are positioned on the shaft. Next, the shaft is positioned within recess 138 of bracket portion 154. A lock washer 200 is placed over the bolt shaft 194, and bolt 190 is threaded into bore 166 of shaft 160. As a result, inner race 142, seal means 170, spacer 178 and bracket portion 136 are all clamped between bolt head 192 and headed portion 162 of shaft 160.

As shown in FIG. 8, the axial dimension of shaft 160 is slightly less than the axial dimensions or widths in total of bracket portion 136, spacer 178, seal means 170 at the shaft and inner race 142. End 168 extends into aperture 138 but does not normally extend through the aperture. As shown in FIG. 8, an axial dimension designated $d_1$ of shaft 160, which is disposed within aperture 138, is less than an axial distance or spacing designated $d_2$ between plug 148 and central web 128 of track 126. Axial dimension $d_1$ is also less than dimension $d_3$ between plug 148 and headed end 162 of shaft 160.

The embodiment of FIG. 8 permits the wheel assembly to be easily removed from bracket 132 without twisting of the bracket or removal of the bracket from the conveyor chain. Fastener 190 is unthreaded from shaft 160. The wheel assembly may be axially shifted only a slight amount towards the vertical web until shaft 160 clears aperture 138. Alternatively, without shifting the wheel assembly axially, the shaft may be axially shifted within the wheel only a slight amount towards the plug 148 until shaft 160 clears aperture 138. In either case, at this point, the wheel assembly may be moved along the track and away from the bracket. The dimensioning of shaft 160 and the remaining elements of the assembly permit the bolt 190 and the shaft 160 to be tensioned, thus holding together in compression the remaining parts. This insures against relative rotation of spacer 178. The noncircular cross section of shaft 160 and the apertures or bores in the remaining elements precludes relative rotation of the inner race and the bracket. When mounting the wheel assembly, the cooperation between the noncircular aperture 138 and outer surface 165 of the shaft holds the shaft against rotation so that fastener 190 may be threaded into bore 166.

It will now be understood that the present invention tightly and nonrotationally secured simultaneously the inner race member or members, shield or seal members, a spacer or collar, if any, as well as the bracket or support in a trolley or carriage assembly for use in conveyors, and especially overhead or floor conveyors. The flat surfaces on the bottom and other exterior areas of the support shaft, bolt or rivet help distribute the loads supported by the assembly to the track more evenly as compared to prior known cylindrical support shafts which support the weight along a line contact. In addition, the stress placed on the support shaft in tension need not be nearly as great since that force is not now relied upon for preventing rotation of the various parts. The present invention does not interfere with relubrication structures, contributes to reduced wear and longer life for the overall assembly, and allows use of smaller, less bulky parts. Also, the present invention greatly eases assembly and disassembly since, even with closed or permanently lubricated wheels, support shafts having removable fasteners need not be held or secured against rotation during removal of the fastener because such holding or rotation resistance occurs automatically.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows.

I claim:

1. In a wheeled support assembly for conveyors of the type including a wheel having a plurality of rolling elements, an outer face and an inner race supporting the rolling elements because the races, an outer plug carried by the outer race and closing an outer face of said wheel, and support means for supporting an object to be transported on said assembly, the improvement comprising:

shaft means engaging said wheel and said support means for securing said wheel to said support means and preventing relative rotation of said inner race and said support means yet permitting ready removal of said wheel from said support means without removal of said outer plug, said shaft means comprising:

an elongated member having an outer surface which is noncircular in cross section and a head portion integral with said member, said inner race defining a recess opening towards said outer plug and a bore having a noncircular cross section, said support means defining an aperture having a noncircular cross section and said member extending through said inner race bore and into said support means aperture with the head portion disposed within said recess, said inner race bore and said support means aperture engaging said elongated member thereby to prevent relative rotation of said inner race, said elongated member and said support means; and retaining means engaging said elongated member for retaining said elongated member to said support means and clamping said inner race between said head portion and said support means.

2. In a wheeled support assembly as defined by claim 1 wherein said elongated member defines an internally threaded bore opening through an end opposite said head portion.

3. In a wheeled support assembly as defined by claim 2 wherein said retaining means comprises:

a fastener having a threaded shaft and a head, said threaded shaft extending through said support means aperture and threadedly engaging said threaded bore of said elongated member.

4. In a wheeled support assembly as defined by claim 3 wherein said fastener defines a through bore and said assembly further includes a grease fitting carried by said fastener head and disposed within said fastener through bore.

5. In a wheeled support assembly as defined by claim 4 wherein said assembly further includes a spacer disposed on said elongated member between said inner race and said support means.

6. In a wheeled support assembly as defined by claim 5 wherein said assembly further includes seal means surrounding said elongated member and disposed between said spacer and said inner race.

7. In a wheeled support assembly as defined by claim 6 wherein the axial dimension of said elongated member is less than the axial width of said inner race, said spacer, said seal means at said member and said support means at said support means aperture.

8. In a wheeled support assembly as defined by claim 3 wherein the axial dimension of said elongated member is less than the axial width of said inner race and said support means so that upon removal of said fastener, said wheel may be removed from said support means upon slight axial movement of said elongated member or of said wheel away from said support means.

9. In a wheeled support assembly as defined by claim 1 wherein said assembly further includes a spacer disposed on said elongated member between said inner race and said support means.

10. In a wheeled support assembly as defined by claim 9 wherein said assembly further includes seal means surrounding said elongated member and disposed between said spacer and said inner race.

11. A trolley wheel assembly for use with an overhead conveyor of the type including a track having a central vertical web and a lower flange, a conveyor chain, and a bracket having a lower portion secured to the chain and an upper portion supporting the trolley wheel assembly, said assembly comprising:

an outer race having an outer peripheral surface riding on the lower flange of the track;

an inner race defining a recess joining a race through bore, said bore through bore having a noncircular cross section;

a plurality of rolling elements retained by and disposed between said races so that said outer race may rotate with respect to said inner race;

a closure plug secured to said outer race and closing a face of said wheel assembly which faces the track vertical web;

shaft means engaging said inner race through bore and said bracket upper portion for supporting said inner race on said bracket and preventing relative rotation of said inner race and said bracket; and a fastener extending through said bracket and engaging said shaft means for removably securing said shaft means to said bracket means, said shaft means having a noncircular in cross section outer surface engaging said inner race through bore and a head portion disposed within said inner race recess, said bracket upper portion defining a noncircular aperture engaging the outer surface of said shaft means whereby said inner race, said shaft means and said bracket are locked against relative rotation and said inner race is clamped between said shaft means head portion and said bracket upper portion.

12. A trolley wheel assembly as defined by claim 11 further including:
seal means surrounding said shaft means between said inner race and said bracket; and
a spacer on said shaft between said seal means and said bracket.

13. A trolley wheel assembly as defined by claim 12 wherein said shaft means comprises:
an elongated body defining said head portion and a threaded bore opening through said body opposite said head portion, said body having an axial dimension less than the axial width dimensions of said inner race, said seal means, said spacer, and said bracket so that said body extends into but not through said bracket aperture.

14. A trolley wheel assembly as defined by claim 13 wherein said fastener comprises a bolt having a bolt head and a threaded shaft threaded into said body bore so that said inner race, said seal means, said spacer and said bracket are clamped between said bolt head and said shaft means head portion.

15. A trolley wheel assembly as defined by claim 14 wherein said body is dimensioned axially so that the portion of said body within said bracket aperture has an axial dimension less than the axial dimension of the space between the closure plug and the end of said head portion of said elongated body so that the wheel assembly is readily removable from said bracket by removal of said fastener and slight axial shifting of said elongated body towards the central web of said track without twisting of said bracket or removal of said bracket from said chain.

16. A trolley wheel assembly as defined by claim 14 wherein said body is dimensioned axially so that the portion of said body within said bracket aperture has an axial dimension less than the axial dimension of the space between the closure plug and the central web of said track when said assembly is on said track so that the wheel assembly is readily removable from said bracket by removal of said fastener and slight axial shifting of said wheel assembly towards said web without twisting of said bracket or removal of said bracket from said chain.

17. A trolley wheel assembly as defined by claim 16 wherein said bolt has a lubricating passage opening through both ends thereof and said body bore opens into said inner race recess.

18. A trolley wheel assembly as defined by claim 17 wherein said seal means includes a shield having a non-circular aperture surrounding and engaging said body.

19. A trolley wheel assembly as defined by claim 13 wherein said bolt has a lubricating passage opening through both ends thereof and said body bore opens into said inner race recess.

20. A trolley wheel assembly as defined by claim 19 wherein said seal means includes a shield having a non-circular aperture surrounding and engaging said body.

* * * * *

UNITED STATES PATENT AND TRADEMARK OFFICE
CERTIFICATE OF CORRECTION

PATENT NO. : 4,502,738
DATED : March 5, 1985
INVENTOR(S) : Randal W. Nauta

It is certified that error appears in the above-identified patent and that said Letters Patent is hereby corrected as shown below:

Column 7, line 3:
    "or" should be --on--;

Column 8, line 23:
    "in" should be --is--;

Column 11, line 35:
    "because" should be --between--;

Column 12, line 5:
    "threadedly" should be --threadably--; and

Column 12, line 49:
    "bore" (second occurrence) should be --race--.

Signed and Sealed this

Thirteenth Day of August 1985

[SEAL]

Attest:

DONALD J. QUIGG

Attesting Officer     Acting Commissioner of Patents and Trademarks